(12) United States Patent
Burgman et al.

(10) Patent No.: US 8,353,797 B2
(45) Date of Patent: Jan. 15, 2013

(54) LUBRICATION SYSTEM FOR A PLANETARY GEAR SET

(75) Inventors: Boris Burgman, Oak Park, MI (US); Csilla B. Parsell, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 264 days.

(21) Appl. No.: 12/846,566

(22) Filed: Jul. 29, 2010

(65) Prior Publication Data
US 2012/0028748 A1 Feb. 2, 2012

(51) Int. Cl.
*F16H 57/04* (2010.01)
(52) U.S. Cl. ...................................... 475/159
(58) Field of Classification Search .................. None
See application file for complete search history.

(56) References Cited

U.S. PATENT DOCUMENTS

| | | | | |
|---|---|---|---|---|
| 4,480,492 A * | 11/1984 | Fujioka et al. | ............ | 74/467 |
| 5,188,576 A * | 2/1993 | Maguire et al. | ............ | 475/348 |
| 5,302,160 A * | 4/1994 | Fujioka | ............ | 475/348 |
| 5,368,528 A * | 11/1994 | Farrell | ............ | 475/348 |
| 5,928,100 A * | 7/1999 | Ohtake et al. | ............ | 475/159 |
| 6,702,711 B2 * | 3/2004 | Zelikov et al. | ............ | 475/331 |
| 6,708,578 B2 * | 3/2004 | Burgman et al. | ............ | 74/421 R |
| 7,252,615 B2 * | 8/2007 | Kempf | ............ | 475/159 |
| 2011/0111917 A1 * | 5/2011 | Heitzenrater et al. | ............ | 475/331 |

* cited by examiner

*Primary Examiner* — Dirk Wright

(57) ABSTRACT

A planetary gear set for a transmission, the planetary gear set having a sun gear, a ring gear and a carrier assembly. The carrier assembly includes an annular first carrier member, at least one pinion pin, and at least one planet gear assembly. The first carrier member has at least one radial groove connecting a step surface to an inner surface of a pinion pin bore. A pinion pin has a bearing surface and a bore. The bore has a first and a second open end, the first open end in communication with the bearing surface the second open end in communication with the radial groove of the carrier member.

15 Claims, 3 Drawing Sheets

LUBRICATION SYSTEM FOR A PLANETARY GEAR SET

FIELD

The present invention relates generally to a lubrication system in a planetary gear set as employed in a transmission, and more particularly to a planetary gear set including a planet gear lubrication system for high speed operation in a transmission.

BACKGROUND

The statements in this section merely provide background information related to the present disclosure and may or may not constitute prior art.

Typical transmissions using planetary gear sets include planet gears that spin at high speeds of up to approximately 15,000 RPM. The high rotational speeds of the planet gears require direct lubrication to the pinion gear bearings. The current solutions include using long radial drills to provide lubrication fluid to the pinion gear bearings. Another solution employs oil catchers, however, both current solutions are relatively expensive and require additional axial length when used in a transmission.

While these planet gear lubrication solutions are robust, there is a constant desire to reduce the cost and complexity of the planetary gear set and to improve the packaging efficiency of the transmission. Accordingly, there is room in the art for an improved planetary gear set having a compact package for a confined space application, improved cost and improved pinion bearing lubrication.

SUMMARY

The present invention provides a planetary gear set for a transmission. The planetary gear set includes a sun gear, a ring gear and a carrier assembly. The carrier assembly includes an annular first carrier member having an axial bore defining a step surface and an outer portion. The outer portion including at least one radial groove and at least one pinion pin bore having an inner surface. The radial groove connects the step surface to the inner surface of the pinion pin bore. The carrier assembly further includes at least one pinion pin having a first and a second end, a bearing surface and a bore. The first end of the pinion pin is disposed in the pinion pin bore of the first carrier member. The bore has a first and a second open end, the first open end is in communication with the bearing surface. The carrier assembly further includes at least one planet gear assembly rotatably supported by the pinion pin and meshing with both the sun gear and ring gear. The planet gear assembly has a bearing assembly, a first thrust plate and a planet gear. The first thrust plate coordinates with the radial groove of the first carrier member to form a lubrication passage in communication with the second open end of the bore of the pinion pin.

In another example of the present invention, the carrier assembly further includes a second carrier member having at least one pinion pin bore. The second end of the pinion pin is disposed in the pinion pin bore of the second carrier member.

In yet another example of the present invention, the first carrier member further includes an inner bearing surface. The planetary gear set further includes a thrust bearing disposed between the inner bearing surface of the carrier member and the sun gear.

In yet another example of the present invention, the first carrier member further includes a collar coaxial with the bore of the first carrier member. The collar has a splined inner surface rotatably fixed to at least one of an input member and an output member.

In yet another example of the present invention, the splined inner surface of the collar of the first carrier member includes a flat portion.

In yet another example of the present invention, the planetary gear set further includes a lubrication path having a first portion, a second portion, a third portion and a fourth portion. The first portion is formed by the flat portion of the collar of the first carrier member. The second portion is formed by the thrust bearing. The third portion is formed by the lubrication passage. The fourth portion is formed by the bore of the pinion pin.

In yet another example of the present invention, the first portion of the lubrication path is in communication with a lubrication fluid source and the second portion of the lubrication path. The second portion of the lubrication path is in communication with the third portion of the lubrication path. The third portion of the lubrication path is in communication with the fourth portion of the lubrication path. The fourth portion of the lubrication path is in communication with the bearing surface of the pinion pin.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

DETAILED DESCRIPTION

The following description is merely exemplary in nature and is not intended to limit the present disclosure, application, or uses.

Figure 1:
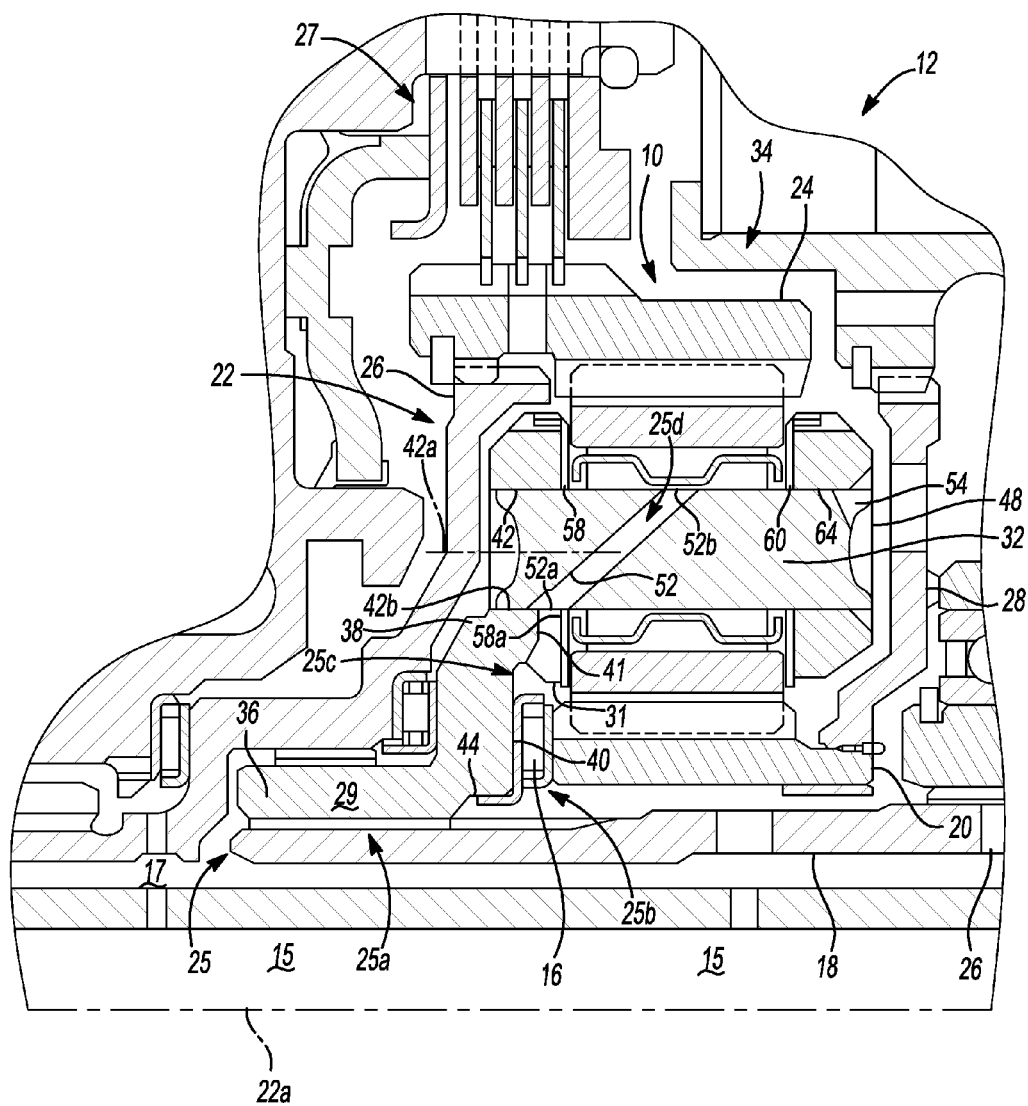
FIG. 1 is a cross section of a lubrication system for a planetary gear set as installed in an exemplary transmission in accordance with an example of the present invention.

Referring to the drawings, wherein like reference numbers refer to like components, in FIG. 1 a cross section of an example of a lubrication system 10 of a planetary gear set 12 as installed in a transmission 14 according to the principles of the present invention is shown and will now be described. The lubrication system 10 includes a pressurized lubrication fluid source 15, the planetary gear set 12, a thrust bearing 16, and a shaft 18. The pressurized lubrication fluid source 15 is a hydraulic control system that generally includes a valve body, a pump and a sump (not shown) for providing a pressurized flow of hydraulic fluid 17. The hydraulic fluid 17 is used by the transmission 14 for lubrication, cooling, and hydraulic controls. The planetary gear set 12 is rotatably supported by the shaft 18 and includes a sun gear 20, a carrier assembly 22 and a ring gear 24. The combination of the various components of the planetary gear set 12, the thrust bearing 16, and the shaft 18 form a lubrication path 25 which transports lubrication fluid 17 from the fluid source 15 to the carrier assembly 22. In the present example, the ring gear 24 is connected to a first input or output member 26 and a torque transmitting mechanism 27, the sun gear 20 is connected to a second input or output member 28 and the carrier assembly 22 is splined for common rotation with the shaft 18. However, other arrangements of the input and output members and torque transmitting mechanisms with the planetary gear set 12 are possible without departing from the scope of the invention.

Figure 2:
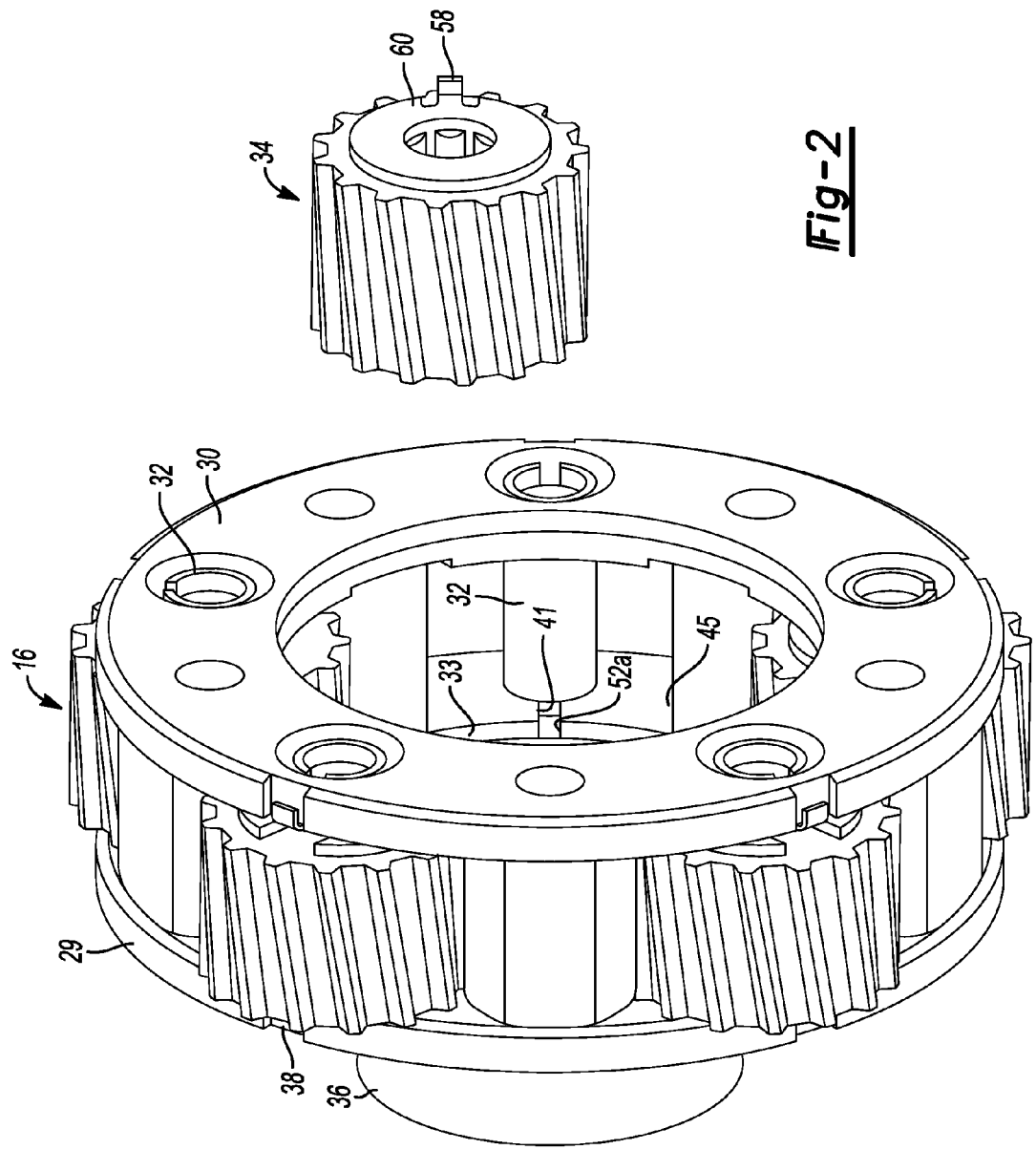
FIG. 2 is a partial perspective view of a carrier assembly having a pinion gear assembly removed in accordance with another example of the present invention.
Figure 3:
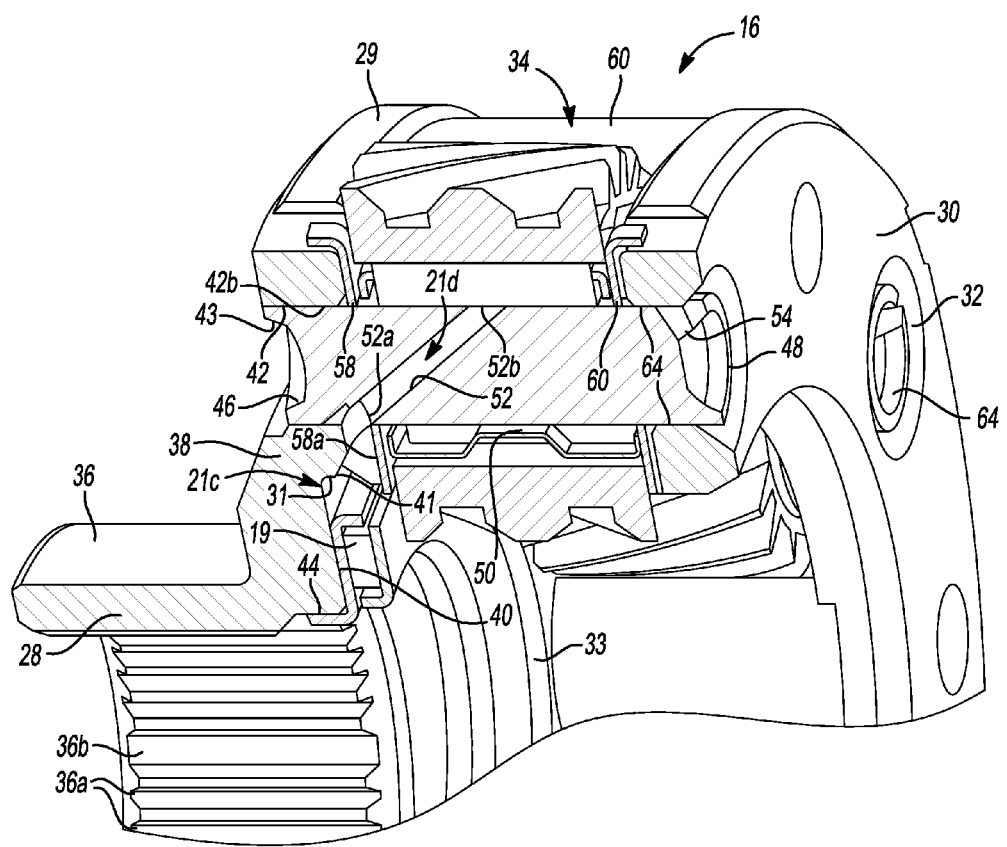
FIG. 3 is a partial cross sectioned perspective view of a carrier assembly, particularly of a pinion gear assembly in accordance with another example of the present invention.

Referring now to FIGS. 2 and 3, and with continuing reference to FIG. 1, the carrier assembly 22 of the planetary gear set 12 will now be described in detail. The carrier assembly 22 includes a first carrier member 29, a second carrier member 30, a plurality of pinion pins 32 and a plurality of planet gear assemblies 34. The first carrier member 29 includes an axial bore 31 that forms a step surface 33, an inner bearing surface 40, an outer portion 38 and a collar portion 36. The step surface 33 is an axial facing surface 33 adjacent to the radial facing inner bearing surface 40. The outer portion 38 includes a plurality of pinion pin bores 42 and a plurality of radial grooves 41. The pinion pin bores 42 have an axis 42A parallel to an axis 22A of the first carrier assembly 22 and define an inner surface 42B. The radial grooves 41 are disposed in the outer portion 38 connecting the step surface 33 to the inner surface 42B of the pinion pin bores 42. The collar portion 36 includes interior axial splines 36A that are engaged for common rotation with the shaft 18. However, one or more of the axial splines 36A have been removed to provide a flat portion 36B, shown best in FIG. 3. The flat portion 36B coordinates with the shaft 18 to provide a first portion 25A of the lubrication path 25 as will be described in detail below. The inner bearing surface 40 faces the sun gear 20. The thrust bearing 16 of the planetary gear set 12 is disposed between the inner bearing surface 40 and sun gear 20 to promote relative rotation between the carrier assembly 22 and sun gear 20 while allowing lubrication fluid 17 to pass radially through the thrust bearing 16.

The plurality of pinion pins 32 each have a first end 46 and a second end 48, a bearing surface 50, a lubrication bore 52 and an alignment slot 54. For any one of the plurality of pinion pins 32, the first end 46 is disposed in the pinion bore 42. The lubrication bore 52 includes a first end 52A and a second end 52B opposite the first end 52A. The first end 52A is disposed proximate the first end 46 of the pinion pin 32 and opens to the bearing surface 50 of the pinion pin 32. The second end 52B is disposed approximately midway between the first end 46 and the second end 48 of the pinion pin 32 and opens to the bearing surface 50 approximately 180° from the first end 52A of the lubrication bore 52. The alignment slot 54 of the pinion pin 32 is disposed on the second end 48 of the pinion pin 32 and provides a visual alignment mechanism as the lubrication bore 52 in the pinion pin 32 must align with the radial groove 41 of the outer portion 38 of the first carrier member 29.

The plurality of planet gear assemblies 34 are each rotatably supported by one of the plurality of pinion pins 32. The planet gear assemblies 34 each include a planet gear 54, a bearing assembly 56 and a first and a second thrust plate 58, 60. The bearing assembly 56 is rotatably supported by the pinion pin 32 and rotatably supports the pinion gear 54. The thrust plates 58, 60 are disposed on the pinion pin 32 with the first thrust plate 58 further disposed between the planet gear 54 and the outer portion 38 of the first carrier member 29.

The second carrier member 30 of the carrier assembly 22 includes a plurality of pinion pin bores 64 preferably spaced evenly apart. The second carrier member 30 is disposed such that the second end 48 of the plurality of pinion pins 32 are supported by the pinion pin bores 64 of the second carrier member 30.

As previously stated the lubrication system 10 is formed by the planetary gear set 12, the thrust bearing 16 and the shaft 18. As the planetary gear set 12 is assembled, the components provide the lubrication path 25 which transfers fluid 17 from the fluid source 15 to the plurality of planet gear assemblies 34. The lubrication path 25 includes the first, a second, a third and a fourth portions 25A-D that are formed by various elements of the planetary gear set 12. For example, as previously described, the first portion 25A of the lubrication path 25 is formed by the flat portion 36B of the collar portion 36 of the first carrier member 28 and the shaft 18. The second portion 25B of the lubrication path 25 is formed by the thrust bearing 40 disposed between the carrier member 28 and the sun gear 20. The second portion is 25B is in communication with the first portion 25A and the third portion 25C of the lubrication path 25. The third portion 25C of the lubrication path 25 is formed by the radial groove 41 of the first carrier member 28 and an outer surface 58A of the first thrust plate 58 of the pinion gear assembly 34. The third portion 25C of the lubrication path 25 communicates with the fourth portion 25D of the lubrication path 25. The fourth portion 25D is formed by the lubrication bore 52 of the pinion pin 32. The first end 52A of the lubrication bore 52 communicates with the third portion 25C of the lubrication path 25 and the second end 52B opens to the bearing surface 50 of the pinion pin 32.

The operation of the lubrication system 10 occurs during the operation of the transmission 14. As the separate components of the planetary gear set 12 rotate, the fluid source 15 provides the pressurized flow of hydraulic fluid 17 to the shaft 18. The shaft 18 is open to transfer the hydraulic fluid 17 to the first portion 25A of the lubrication path 25 which is a combination of the collar portion 26 of the first carrier member 28 and the shaft 18. The hydraulic fluid 17 passes through the first portion 25A of the lubrication path 25 to the second portion 25B which is the thrust bearing 16. After passing through the thrust bearing 16, the hydraulic fluid 17 leaves the second portion 25B and enters the third portion 25C which is formed by a combination of the plurality of radial grooves 41 of the carrier member 22 and the outer surface 58A of the first thrust plate 58 of the pinion gear assembly 34. Next, the hydraulic fluid 17 enters the fourth portion 25D of the lubrication path 25 formed by the lubrication bore 52 of the pinion pin 32. Finally, the hydraulic fluid 17 exits the lubrication bore and is distributed on the bearing surface 50 of the pinion pin 32 and interacts with the bearing assembly 56 providing a constant flow of pressurized hydraulic fluid 17.

The description of the invention is merely exemplary in nature and variations that do not depart from the gist of the invention are intended to be within the scope of the invention. Such variations are not to be regarded as a departure from the spirit and scope of the invention.

What is claimed is:

1. A planetary gear set for a transmission, the planetary gear set comprising:
   a sun gear;
   a ring gear; and
   a carrier assembly, the carrier assembly including:
      an annular first carrier member having an inner bearing surface and an axial bore defining a step surface and an outer portion, the outer portion including at least one radial groove and at least one pinion pin bore having an inner surface, wherein the radial groove connects the step surface to the inner surface of the pinion pin bore;
      at least one pinion pin having a first and a second end, a bearing surface and a bore, the first end disposed in the at least one pinion pin bore of the first carrier member, and wherein the bore has a first and a second open end, the first open end in communication with the bearing surface; and at least one planet gear assembly rotatably supported by the at least one pinion pin and meshed with both the sun gear and ring gear, the at least one planet gear assembly having a bearing assembly, a first thrust plate and a planet gear, wherein the first thrust plate coordinates with the at least one radial groove of the first carrier member to form a lubrication passage in communication with the second open end of the bore of the at least one pinion pin; and a thrust bearing disposed between the inner bearing surface of the first carrier member and the sun gear.

2. The planetary gear set of claim 1 wherein the carrier assembly further includes a second carrier member having at least one pinion pin bore, the second end of the at least one pinion pin is disposed in the at least one pinion pin bore of the second carrier member.

3. The planetary gear set of claim 2 wherein the first carrier member further includes a collar coaxial with the bore of the first carrier member, the collar having a splined inner surface rotatably fixed to at least one of an input member and an output member.

4. The planetary gear set of claim 3 wherein the splined inner surface of the collar of the first carrier member includes a flat portion.

5. The planetary gear set of claim 4 further including a lubrication path having a first portion, a second portion, a third portion and a fourth portion, and wherein the first portion is formed by the flat portion of the collar of the first carrier member, the second portion is formed by the thrust bearing, the third portion is formed by the lubrication passage, and the fourth portion is formed by the bore of the at least one pinion pin.

6. The planetary gear set of claim 5 wherein the first portion of the lubrication path is in communication with a lubrication fluid source and the second portion of the lubrication path, the second portion of the lubrication path is in communication with the third portion of the lubrication path, the third portion of the lubrication path is in communication with the fourth portion of the lubrication path and the fourth portion of the lubrication path is in communication with the bearing surface of the at least one pinion pin.

7. A planetary gear set for a transmission, the planetary gear set comprising:

a sun gear;

a ring gear;

a carrier assembly, the carrier assembly including:

an annular first carrier member having an inner bearing surface, an axial bore defining a step surface and an outer portion, the outer portion including at least one radial groove and at least one pinion pin bore having an inner surface, wherein the radial groove connects the step surface to the inner surface of the pinion pin bore;

at least one pinion pin having a first and a second end, a bearing surface and a bore, the first end disposed in the at least one pinion pin bore of the first carrier member, and wherein the bore has a first and a second open end, the first open end in communication with the bearing surface; and at least one planet gear assembly rotatably supported by the at least one pinion pin and meshed with both the sun gear and ring gear, the at least one planet gear assembly having a bearing assembly, a first thrust plate and a planet gear, wherein the first thrust plate coordinates with the at least one radial groove of the first carrier member to form a lubrication passage in communication with the second open end of the bore of the at least one pinion pin;

a thrust bearing disposed between the inner bearing surface of the carrier member and the sun gear; and a second carrier member having at least one pinion pin bore, the second end of the at least one pinion pin is disposed in the at least one pinion pin bore of the second carrier member.

8. The planetary gear set of claim 7 wherein the first carrier member further includes a collar coaxial with the bore of the first carrier member, the collar having a splined inner surface rotatably fixed to at least one of an input member and an output member.

9. The planetary gear set of claim 8 wherein the splined inner surface of the collar of the first carrier member includes a flat portion.

10. The planetary gear set of claim 9 further including a lubrication path having a first portion, a second portion, a third portion and a fourth portion, and wherein the first portion is formed by the flat portion of the collar of the first carrier member, the second portion is formed by the thrust bearing and the step surface of the first carrier, the third portion is formed by the lubrication passage, and the fourth portion is formed by the bore of the at least one pinion pin.

11. The planetary gear set of claim 10 wherein the first portion of the lubrication path is in communication with a lubrication fluid source and the second portion of the lubrication path, the second portion of the lubrication path is in communication with the third portion of the lubrication path, the third portion of the lubrication path is in communication with the fourth portion of the lubrication path and the fourth portion of the lubrication path is in communication with the bearing surface of the at least one pinion pin.

12. A planetary gear set for a transmission, the planetary gear set comprising:

a sun gear;

a ring gear;

a carrier assembly, the carrier assembly including:

an annular first carrier member having an inner bearing surface, an axial bore defining a step surface, an outer portion and a collar coaxial with the bore, the outer portion including at least one radial groove and at least one pinion pin bore having an inner surface, the collar having a splined inner surface rotatably fixed to at least one of an input member and an output member, wherein the radial groove connects the step surface to the inner surface of the pinion pin bore;

at least one pinion pin having a first and a second end, a bearing surface and a bore, the first end disposed in the at least one pinion pin bore of the first carrier member, and wherein the bore has a first and a second open end, the first open end in communication with the bearing surface; and at least one planet gear assembly rotatably supported by the at least one pinion pin and meshed with both the sun gear and ring gear, the at least one planet gear assembly having a bearing assembly, a first thrust plate and a planet gear, wherein the first thrust plate coordinates with the at least one radial groove of the first carrier member to form a lubrication passage in communication with the second open end of the bore of the at least one pinion pin;

a thrust bearing disposed between the inner bearing surface of the carrier member and the sun gear; and a second carrier member having at least one pinion pin bore, the second end of the at least one pinion pin is disposed in the at least one pinion pin bore of the second carrier member.

13. The planetary gear set of claim 12 wherein the splined inner surface of the collar of the first carrier member includes a flat portion.

14. The planetary gear set of claim 13 further including a lubrication path having a first portion, a second portion, a third portion and a fourth portion, and wherein the first portion is formed by the flat portion of the collar of the first carrier member, the second portion is formed by the thrust bearing and the step surface of the first carrier, the third portion is formed by the lubrication passage, and the fourth portion is formed by the bore of the at least one pinion pin.

15. The planetary gear set of claim 14 wherein the first portion of the lubrication path is in communication with a lubrication fluid source and the second portion of the lubrication path, the second portion of the lubrication path is in communication with the third portion of the lubrication path, the third portion of the lubrication path is in communication with the fourth portion of the lubrication path and the fourth portion of the lubrication path is in communication with the bearing surface of the at least one pinion pin.

* * * * *